July 9, 1957　　　W. B. CLARK　　　2,798,532
SEAT ADJUSTER
Filed Sept. 22, 1954　　　3 Sheets-Sheet 1
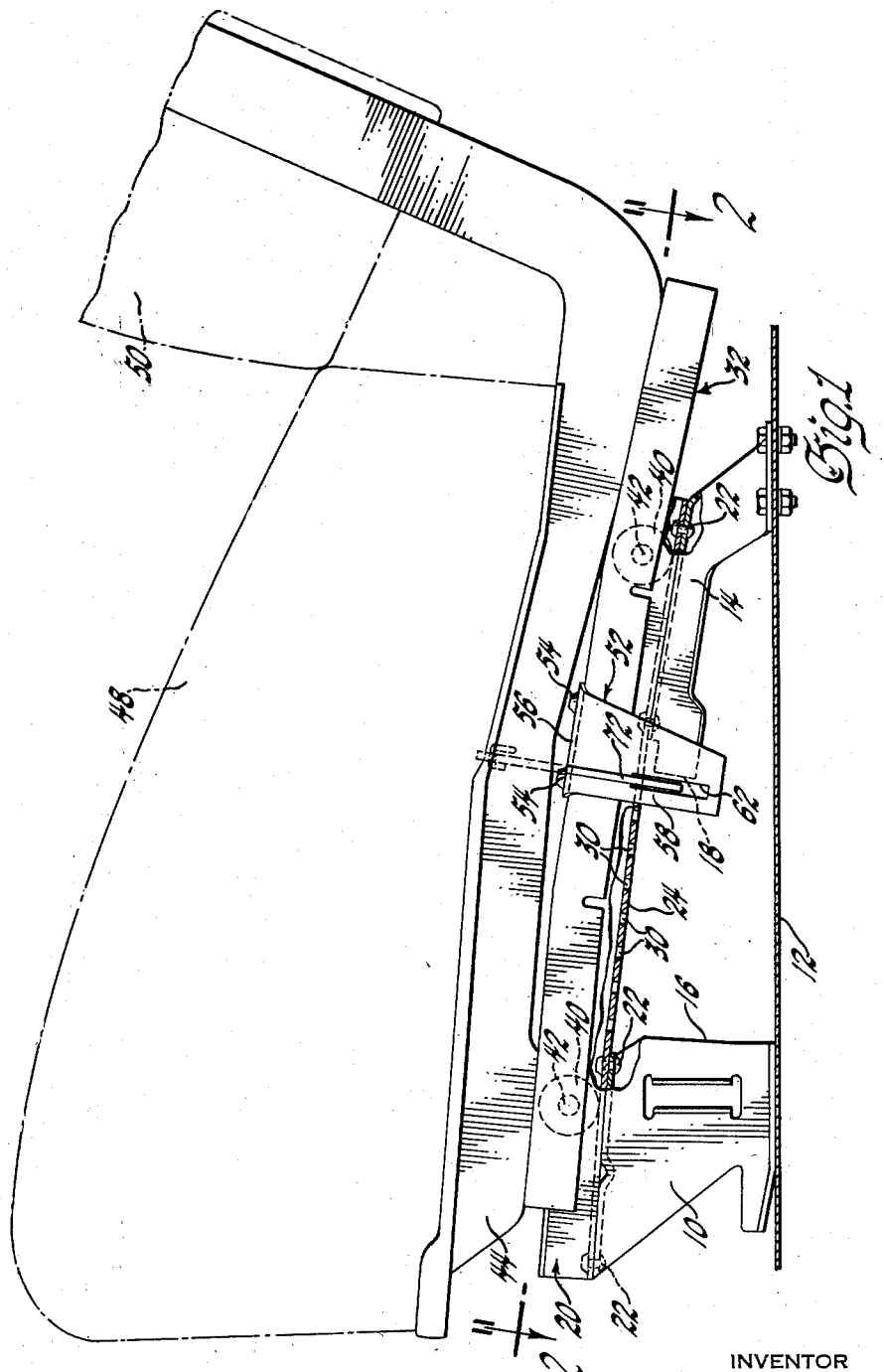
INVENTOR
William B. Clark
BY
Paul Fitzpatrick
ATTORNEY

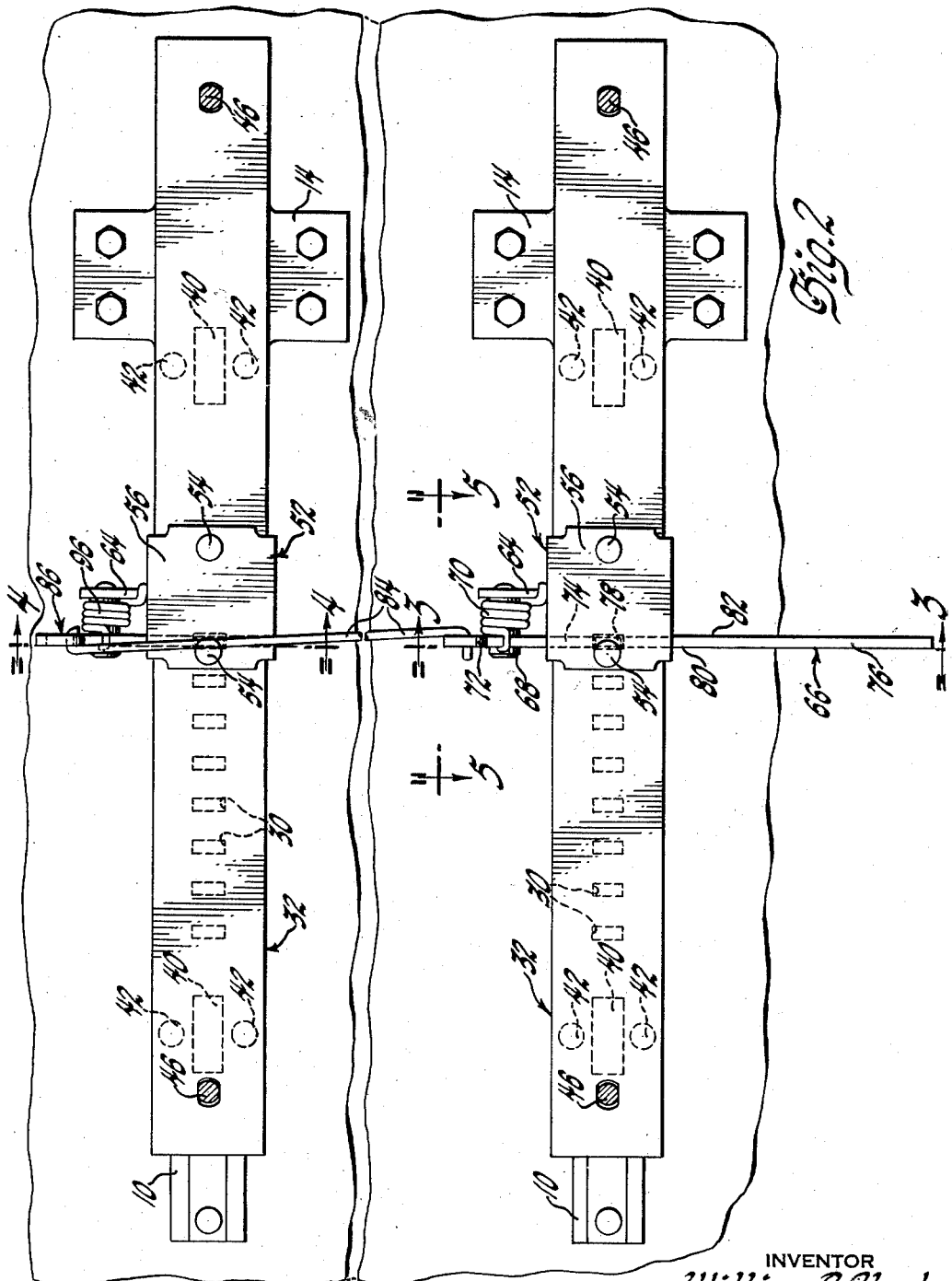

July 9, 1957 W. B. CLARK 2,798,532
SEAT ADJUSTER
Filed Sept. 22, 1954 3 Sheets-Sheet 3
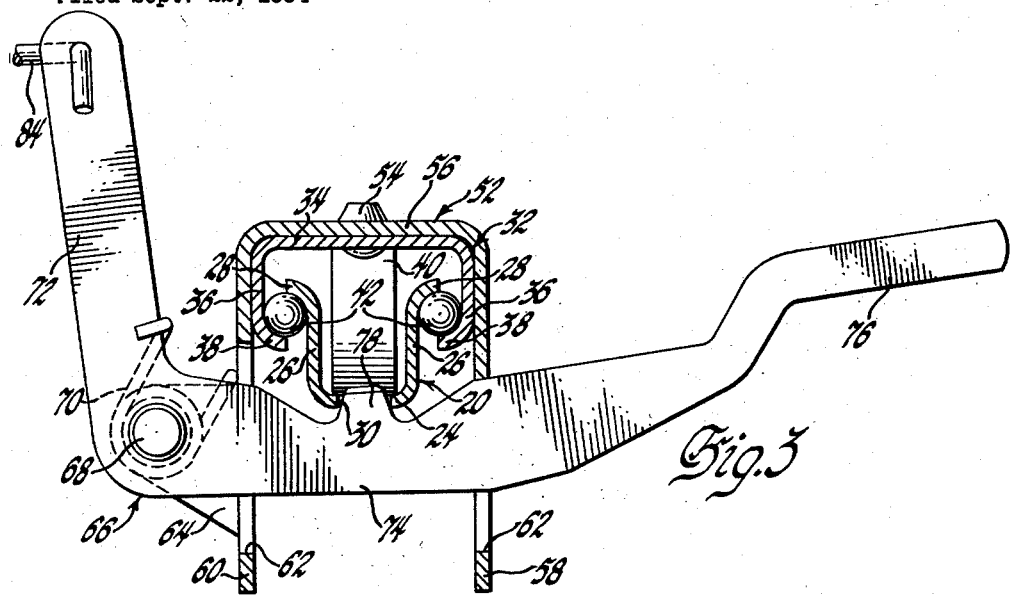
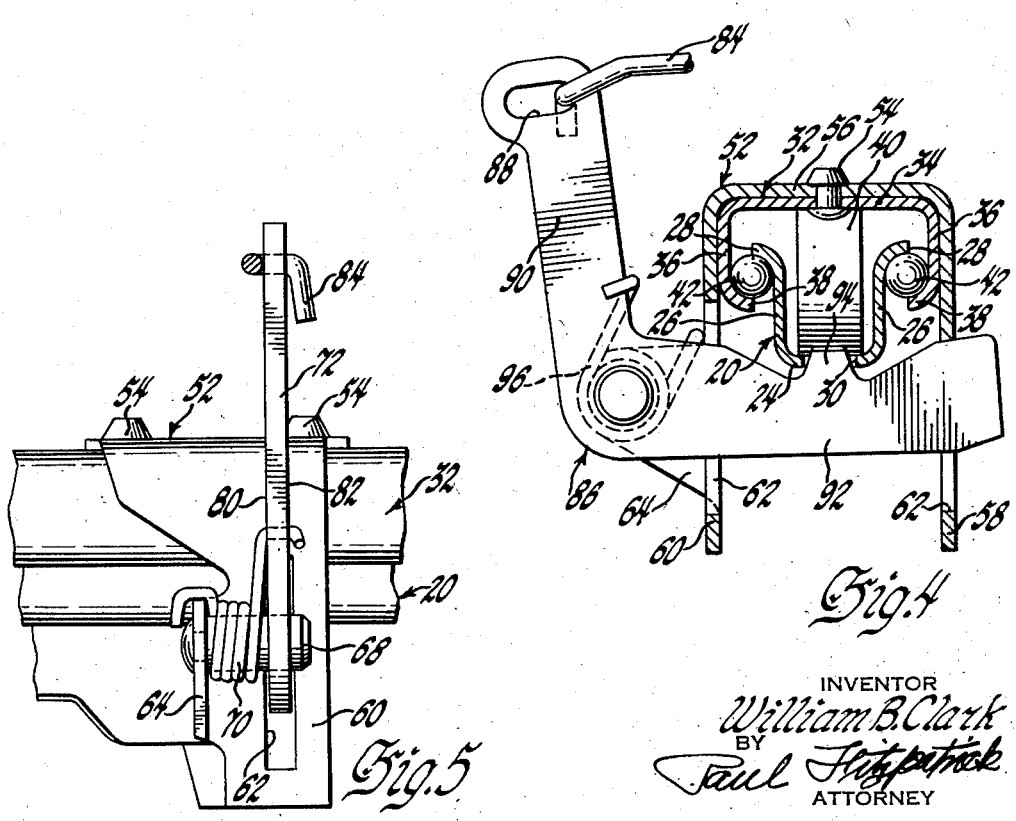
INVENTOR
William B. Clark
BY Paul Fitzpatrick
ATTORNEY

United States Patent Office 2,798,532
Patented July 9, 1957

2,798,532

SEAT ADJUSTER

William B. Clark, Detroit, Mich., assignor to General Motors Corporation, Detroit, Mich., a corporation of Delaware Application September 22, 1954, Serial No. 457,710

9 Claims. (Cl. 155—14)

This invention relates to a seat adjuster, and more particularly to a seat adjuster for the seat of an automobile.

One feature of the invention is that it provides an improved seat adjuster; another feature of the invention is that it provides improved latching means for the seat adjuster, including a latching member engaging the bottom web of the stationary channel of the seat adjuster; still another feature of the invention is that the latching member has a portion extending beneath the bottom web of the stationary seat adjuster channel and a tooth which projects upwardly from the latch member for engagement with a selected one of a plurality of centrally disposed notches in said web; yet a further feature of the invention is that it provides novel and improved limit stop means for the seat adjuster; and still another feature of the invention is that the latch member is adapted to abut generally vertical stop surfaces on front and rear floor support brackets to limit sliding movement of the slidable seat supporting channel.

Other features and advantages of the invention will be apparent from the following description and from the drawings, in which:

Fig. 1 is a side elevation, partly in section of one side of the seat adjuster and a portion of the front seat of an automobile;

Fig. 2 is an enlarged horizontal section taken along the line 2—2 of Fig. 1 showing the seat adjuster channels on opposite sides of the car, the center portion being broken away;

Fig. 3 is a further enlarged transverse section through the latch at the driver's side, being taken along the line 3—3 of Fig. 2;

Fig. 4 is a transverse section through the latch at the passenger's side, being taken along the line 4—4 of Fig. 2; and Fig. 5 is a fragmentary vertical longitudinal section taken along the line 5—5 of Fig. 2.

The seat adjuster includes, at each side of the car, front and rear support brackets which mount telescoping channel members. In this improved seat adjuster, the respective front brackets, rear brackets and channel members may be identical on the driver's side and passanger's side, and, therefore, the members on opposite sides of the car are designated by the same reference character. At each side of the car a front floor support bracket 10 is bolted or otherwise secured to the floor 12 of an automobile, and a rear floor support bracket 14 is bolted to the floor 12 in longitudinal spaced relationship with the front floor support bracket 10. The floor bracket 10 has a generally vertical rearwardly facing stop surface 16 and the rear bracket 14 has a generally vertical forwardly facing stop surface 18. The distance between these stop surfaces determines the limit of sliding movement of the seat.

At each side of the car an elongated stationary channel designated generally at 20 is mounted upon the front and rear brackets 10, 14, each channel 20 being secured to the respective brackets by rivets 22. As shown in Figs. 3 and 4, the stationary channel 20 is U-shaped, having a bottom web 24 and opposite sides 26. The upper edges of the sides are rolled outwardly to form flanges 28. A plurality of centrally disposed longitudinally spaced slots or notches 30 are formed in the bottom web 24 of the stationary channel, these notches being located between the stop surfaces 16 and 18.

A movable seat supporting channel designated generally at 32 is slidably mounted on the stationary channel 20. As shown best in Figs. 3 and 4, the slidable channel is in the form of an inverted U, having a top web 34 and opposite sides 36 which are located outside the sides 26 of the relatively narrow stationary channel 20. Each of the sides 36 terminates in an inwardly turned rolled flange 38. Anti-friction means between the channels include rollers 40 adjacent each end of the channels and balls 42 between the flanges 28 and 38. The rollers take the vertical load and the balls hold the slidable channel against side sway.

As shown in Figs. 1 and 2, a seat frame 44 is secured by bolts 46 to the top web 34 of the slidable channel. The seat frame carries a seat cushion 48 and a back cushion 50.

The structure above described is generally conventional and well known in the art, with the exception that in the past usually the locking notches have been located in one of the sides of the stationary channel or in a separate bracket secured to one of the sides of said channel. By forming the notches in the center of the bottom web of the channel a symmetrical structure is obtained, permitting use of identical channel members at each opposite side of the car, thereby reducing tooling costs and facilitating assembly of the seat adjuster.

In order to lock the channels 20 and 32 against relative movement at a selected adjusted position, a latch member is provided at each side of the seat for cooperation with a selected one of the notches 30. A latch support bracket designated generally at 52 is secured by rivets 54 to the top web 34 of each slidable channel. The bracket 52 is formed as an inverted U, having a top base 56 through which the rivets 54 extend and having opposite sides 58 and 60 which straddle the opposite sides 36 of the slidable channel and which extend down below the level of the bottom web 24 of the stationary channel. Each of the sides 58 and 60 of the latch support bracket has a vertical slot 62 therein and a mounting lug 64 projects at a right angle from the side 60 of each of the mounting brackets.

On the driver's side of the car an L-shaped bell crank latch member designated generally at 66 is pivotally mounted on the lug 64 by means of a stud 68 projecting forwardly from the lug 64. A coil spring 70 urges the latch member 66 in a counterclockwise direction as the parts appear in Fig. 3. The latch member has a base arm 72 which projects upwardly from the pivotal mounting pin 68 and a body arm 74 which extends horizontally through the slots 62 in the sides of the support bracket 52. This body arm includes a portion which extends transversely beneath the bottom web 24 of the stationary channel and which terminates in a handle 76. A latching tooth 78 projects upwardly from the portion 74 beneath the lower web 24 of the stationary channel and is adapted to engage in a selected one of the notches 30 to lock the seat adjuster in a selected position. The handle 76 projects outwardly from the side of the seat where it may easily be reached by the driver of the car. Depressing the handle pivots the latch member in a clockwise direction and releases the latching tooth 78 from the notch so that the seat may be moved forwardly or backwardly to a new selected position where a different notch may be engaged by the latching tooth.

The latch 66 is formed as a sheet metal stamping having front and rear generally vertical surfaces 80 and 82 adapted to abut the respective stop surfaces 16 and 18 of the respective front and rear floor support brackets. Thus, the latch member also serves as a positive stop means to limit sliding movement of the slidable channel 32. This combination of latching and stop functions simplifies the seat adjuster and reduces the number of parts.

The free end of the base arm 72 of the latch member 66 is connected to a rod 84 which extends transversely across the automobile beneath the seat and which is connected at its other end to a generally similar latch member 86. As shown in Fig. 4, a slot 88 in the latch 86 provides a lost motion connection so that either latch may operate independently and accidental failure of latch 86 to engage in one of the notches will not prevent latch 66 from engaging in a notch to latch the seat. The latch member 86 at the passenger's side of the seat is generally similar to the latch member 66 at the driver's side of the seat, except that the latch member 86 preferably has no handle, the member comprising only a base leg 90 and a body portion 92 extending through the slots 62 in the support bracket and having a latching tooth 94. A spring 96 urges the latch towards its latched position.

In the operation of the seat adjuster, moving the handle 76 at the driver's side downwardly will pivot both latches 66 and 86 in a clockwise direction and release both sides of the seat. When the handle is released and the seat is moved to a position where one of the notches 30 in each of the seat adjuster channels is aligned with the latching tooth of the respective latch member, the spring associated with each latch member will pivot each latch member into latching engagement in the adjacent notch to hold the slidable channel against movement with respect to the stationary channel. The only difference in the parts at opposite sides of the seat is in the shape of the latch member itself. The stationary channel, the slidable channel and the latch support bracket at opposite sides of the seat are similar and identical parts may be used.

While I have shown and described one embodiment of my invention, it is capable of many modifications. Changes, therefore, in the construction and arrangement may be made without departing from the spirit and scope of the invention as set forth in the appended claims.

I claim:

1. A seat adjuster of the character described, including: a front floor support bracket having a generally vertical rearwardly facing stop surface; a rear floor support bracket spaced from said front backet and having a generally vertical forwardly facing stop surface, a stationary channel mounted upon said front and rear brackets; a seat supporting channel slidably mounted on said stationary channel; and a latch member mounted on said seat supporting channel and adapted to engage said stationary channel to lock said channels against relative movement, said latch member having generally vertical front and rear surfaces for abutting said stop surfaces to limit sliding movement of the slidable channel.

2. Apparatus of the character claimed in claim 1, wherein said stationary channel has a plurality of longitudinally spaced notches located between said stop surfaces for engagement by said latch member.

3. Apparatus of the character claimed in claim 1, wherein said stationary channel has a bottom web and opposite sides, said web having a plurality of centrally disposed longitudinally spaced notches located between said stop surfaces for engagement by said latch member.

4. A seat adjuster of the character described, including: a front floor support bracket having a generally vertical rearwardly facing stop surface; a rear floor support bracket spaced from said front bracket and having a generally vertical forwardly facing stop surface; a stationary channel mounted upon said front and rear brackets, said channel having a bottom web and opposite sides, said web having a plurality of centrally disposed longitudinally spaced notches located between said stop surfaces; a seat supporting channel slidably mounted on said stationary channel; and a latch member pivotally mounted on said seat supporting channel, said latch member extending beneath said web and having a tooth extending upwardly beneath said web for engagement with a selected one of said notches to lock said channels against relative movement, said latch member having generally vertical front and rear surfaces for engaging said stop surfaces to limit sliding movement of the sliding channel.

5. A seat adjuster of the character described, including: an elongated stationary channel having a bottom web and opposite sides, said web having a plurality of centrally disposed longitudinally spaced notches; a seat supporting channel slidably mounted on said stationary channel; a latch support bracket depending from said seat supporting channel and having a slotted portion projecting below the level of the web in said stationary channel; and a latch member pivotally mounted on said latch support bracket on one side of said web, said latch having a handle portion on the other side of said web, a portion extending through the slots in said latch support bracket beneath said web, and a tooth extending upwardly from said latch member beneath said web for engagement with a selected one of said notches to lock said channels against relative movement.

6. A seat adjuster of the character described, including: a front floor support bracket; a rear floor support bracket spaced from said front bracket; an elongated stationary channel mounted upon said front and rear brackets, said channel having a bottom web and opposite sides, said web having a plurality of centrally disposed longitudinally spaced notches; a seat supporting channel slidably mounted on said stationary channel; a latch support bracket depending from said seat supporting channel and having a slotted portion projecting below the level of said web in said stationary channel; and a latch member pivotally mounted on said latch support bracket on one side of said web, said latch having a portion extending through the slots in said latch support bracket beneath said web and a tooth extending upwardly from said latch member beneath said web for engagement with a selected one of said notches to lock said channels against relative movement.

7. A seat adjuster of the character described, including: a front floor support bracket having a generally vertical rearwardly facing stop surface; a rear floor support bracket spaced from said front bracket and having a generally vertical forwardly facing stop surface; an elongated stationary channel mounted upon said front and rear brackets, said channel having a bottom web and opposite sides, said web having a plurality of centrally disposed longitudinally spaced notches located between said stop surfaces; a seat supporting channel slidably mounted on said stationary channel; and a latch member pivotally mounted on said seat supporting channel, said latch having a portion extending beneath said web and a tooth projecting upwardly therefrom beneath said web for engagement with a selected one of said notches to lock said channels against relative movement, said latch member having generally vertical front and rear surfaces for engaging said stop surfaces to limit sliding movement of the sliding channel.

8. A seat adjuster of the character described, including: a front floor support bracket having a generally vertical rearwardly facing stop surface; a rear floor support bracket spaced from said front bracket and having a generally vertical forwardly facing stop surface; an elongated stationary channel mounted upon said front and rear brackets, said channel having a bottom web and opposite sides, said web having a plurality of centrally disposed longitudinally spaced notches located between said stop surfaces; a seat supporting channel slidably mounted on said stationary channel; and a latch member pivotally mounted on said seat supporting channel on one side of said web, said latch having a handle portion on the other side of said web, a portion extending beneath said web and a tooth projecting upwardly therefrom beneath said web for engagement with a selected one of said notches to lock said channels against relative movement, said latch member having generally vertical front and rear surfaces for abutting said stop surfaces into limit sliding movement of the sliding channel.

9. A seat adjuster of the character described, including: a front floor support bracket having a generally vertical rearwardly facing stop surface; a rear floor support bracket spaced from said front bracket and having a generally vertical forwardly facing stop surface; an elongated stationary channel mounted upon said front and rear brackets, said channel having a bottom web and opposite sides, said web having a plurality of centrally disposed longitudinally spaced notches located between said stop surfaces; a seat supporting channel slidably mounted on said stationary channel; anti-friction means between said channels; a latch support bracket depending from said seat supporting channel and having a slotted portion projecting below the level of the web in said stationary channel; and a latch member pivotally mounted on said latch support bracket on one side of said web, said latch having a handle portion on the other side of said web, a portion extending through the slots in said latch support bracket beneath said web, and a tooth extending upwardly from said latch member beneath said web for engagement with a selected one of said notches to lock said channels against relative movement, said latch member having generally vertical front and rear surfaces for abutting said stop surfaces to limit sliding movement of the slidable channel.

References Cited in the file of this patent

UNITED STATES PATENTS

| | | |
|---|---|---|
| 2,126,142 | Saunders et al. | Aug. 9, 1938 |
| 2,713,384 | Rosenberg | July 19, 1955 |